United States Patent
Spitzer et al.

(10) Patent No.: US 7,146,413 B2
(45) Date of Patent: Dec. 5, 2006

(54) REMOTE UPDATING OF PRINTER SETTINGS ON A CLIENT DEVICE IN A NETWORKED ENVIRONMENT

(75) Inventors: Jennifer Mae Spitzer, Boise, ID (US); Judy Nicole Edwards, Meridian, ID (US); Garth Frederick Schmeling, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 10/172,656

(22) Filed: Jun. 14, 2002

(65) Prior Publication Data

US 2003/0233428 A1    Dec. 18, 2003

(51) Int. Cl.
*G06F 15/177* (2006.01)
*G06F 3/12* (2006.01)
(52) U.S. Cl. ..................... 709/220; 358/1.15
(58) Field of Classification Search ........ 709/202–203, 709/206, 217–218, 220–222; 358/1.15, 1.13; 710/8
See application file for complete search history.

(56) References Cited

U.S. PATENT DOCUMENTS

| | | | | |
|---|---|---|---|---|
| 5,687,320 A | * | 11/1997 | Wiley et al. | 709/245 |
| 5,692,111 A | * | 11/1997 | Marbry et al. | 358/1.15 |
| 5,897,645 A | * | 4/1999 | Watters | 715/523 |
| 6,115,132 A | * | 9/2000 | Nakatsuma et al. | 358/1.14 |
| 6,738,841 B1 | * | 5/2004 | Wolff | 710/62 |
| 6,814,510 B1 | * | 11/2004 | Sabbagh et al. | 400/63 |
| 2003/0018705 A1 | * | 1/2003 | Chen et al. | 709/202 |
| 2003/0051011 A1 | * | 3/2003 | Schacht et al. | 709/221 |

OTHER PUBLICATIONS

Wells, Bob; "WSH Logon Scripts"; Feb. 1999; Windows IT Pro; http://www.windowsitpro.com/Articles/Index.cfm?ArticleD=4760; p. 1.*
Large Scale Print Spool Service, Requero, I., et. al. USENIX CERN, Lisa XII, Dec. 1998, p. 229-242.*
Migration of processes, files, and virtual devices in the MDX operating system, Harald Schrimpf, SIGOPS Oper. Syst. Rev., ACM, vol. 29, No. 2, 1995, ISSN 0163-5980, pp. 70-81.*
Network Configuration with Plug-and-Play Components, Syed K. Raza, Tech Report SCE 98-04, p. 1-12.*

* cited by examiner

*Primary Examiner*—Beatriz Prieto (57) ABSTRACT

Exemplar embodiments for facilitating remote updating of a client device's printer settings in a networked environment are disclosed. An illustrative method includes the steps of receiving information from a network in a client device, the information comprising a predefined printer setting that corresponds to a printer accessible through a print server coupled to the network, and automatically updating a printer setting on the client device to correspond to the predefined printer setting. Illustrative methods may be implemented via an executable program received in the client device by e-mail or as part of the network login process. Illustrative systems and computer readable media also are provided.

27 Claims, 5 Drawing Sheets

REMOTE UPDATING OF PRINTER SETTINGS ON A CLIENT DEVICE IN A NETWORKED ENVIRONMENT

BACKGROUND OF THE INVENTION

1. Field of the Invention

The invention relates generally to computer networks, and, more particularly, to remote updating of printer settings on a client device in a networked environment.

2. Related Art

A typical computer network environment includes one or more servers and a plurality of client devices (computers). The client devices are typically configured to print documents via printers that are connected to the network through a print server. The client devices typically access the printers through print shares stored on a print server. Print shares are shared folders that allow print jobs to be queued to a print spooler that forwards the print jobs to the associated printer. Sometimes it is necessary to replace a print server through which printers are accessible through the network with another print server. In such cases, some or all of the printers that were formerly accessible through the old print server must now be accessed through the new print server. This is typically referred to as migrating the print shares from the old print server to the new print server.

In order for a client device to print through the new print server, however, the printer settings on the client device must be modified to reflect the migrated print shares. This is generally the responsibility of a system administrator. The system administrator typically manually modifies the printer settings for each client device in the system by going to the location of each client device and manually adding the printer settings that correspond to the new print server, and deleting the printer settings that correspond to the old print server. Unfortunately, depending on the size of the network and the proximity of the client devices to the system administrator, this can be a tedious and time consuming process.

Therefore, there is a need for overcoming the deficiencies and inadequacies stated above.

SUMMARY

Briefly described, embodiments of the invention relate to methods, systems and computer readable media for facilitating remote updating of printer settings in a networked environment. An illustrative method includes the steps of receiving information from a network in a client device, the information comprising a predefined printer setting that corresponds to a printer accessible through a print server coupled to the network, and automatically updating a printer setting on the client device to correspond to the predefined printer setting.

An illustrative system includes a client device coupled to a network, wherein the client device is configured to receive information from the network, the information comprising a predefined printer setting that corresponds to a printer accessible through a print server coupled to the network, and to automatically update a printer setting on the client device to correspond to the predefined printer setting.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

Embodiments of the invention can be implemented in software (e.g., firmware), hardware, or a combination thereof. In one exemplar embodiment, the invention is implemented in a configuration in which a plurality of devices are coupled to a network and the user of the system uses a computer, such as a personal computer (PC), to access the connected devices, and in which the invention is implemented using primarily software. Regardless of the manner of implementation, the software portion of the invention can be executed by a special or general-purpose computer, such as a personal computer (PC; IBM-compatible, Apple-compatible, or otherwise), workstation, minicomputer, or mainframe computer. Various other types of computing devices, including such computing devices as personal digital assistants (PDAs) and cellular telephones having computing capabilities, may be used to execute the software portion of the invention.

Prior to discussing particular aspects of embodiments of the invention, a brief description of the overall system and environment in which the invention resides is provided. In this regard, FIG. 1 is a block diagram illustrating an exemplar system environment in which the invention may reside.

Figure 1:
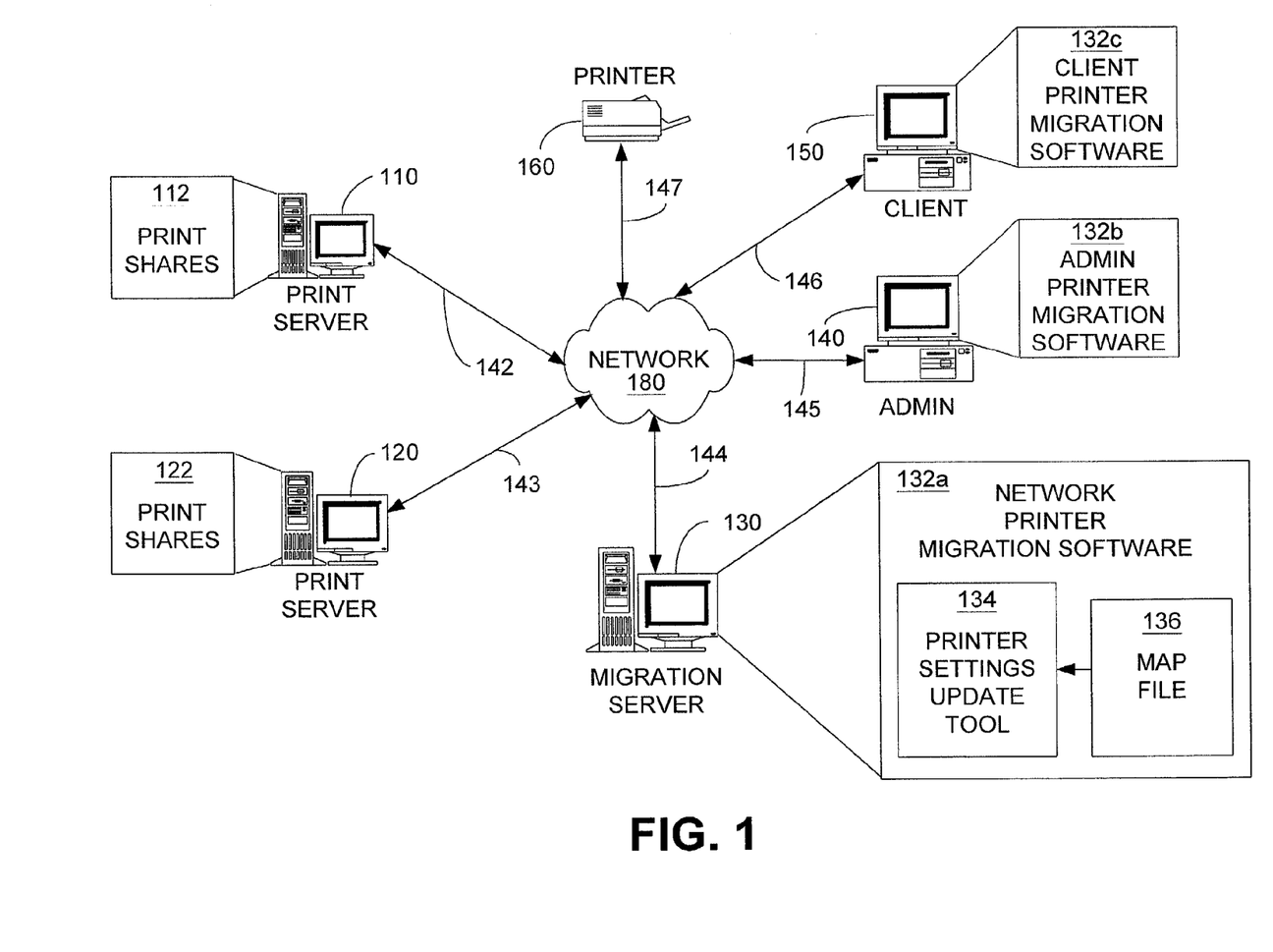
FIG. 1 is a block diagram illustrating an exemplar overall system environment in which embodiments of the invention reside.

FIG. 1 illustrates an exemplar network environment including a print server 110, a print server 120, a migration server 130, an administrative device 140, a client device 150, and a printer 160. Each of these devices is coupled to a network 180. Print server 110 is coupled to the network 180 via connection 142. Print server 120 is coupled to the network via connection 143. Migration server 130 is coupled to the network 180 via connection 144. Administrative device 140 is coupled to the network 180 via connection 145. Client device 150 is coupled to the network 180 via connection 146. Printer 160 is coupled to the network 180 via connection 147. Although one client device 150 and one printer 160 are illustrated in FIG. 1, a typical networked environment may include many client devices, and each client device may be coupled to multiple printers.

The network 180 can be any network used to couple devices and can be, for example, a local area network (LAN) or a wide area network (WAN). In the example to follow, the network 180 is illustratively a LAN. Furthermore, the connections 142, 143, 144, 145, 146 and 147 can be any known connections that can couple electronic devices to each other or to a network, such as direct electrical and/or optical connections, wireless connections, dial-up modem style connections, digital subscriber line (DSL) connections, cable modem connections, and/or T1 or other high speed backbone communication lines.

Administrative device 140 can be, for example but not limited to, a personal computer (PC), such as illustrated in FIG. 1, or a workstation. Similarly, client device 150 can be a PC, such as illustrated in FIG. 1, or a workstation. Administrative device 140 and client device 150 can be also be various other types of computing devices, including such computing devices as personal digital assistants (PDAs) and cellular telephones having computing capabilities.

Print server 110 includes print shares 112. Print shares are shared folders that allow print jobs to be queued to a print spooler that forwards the print jobs to the associated printer. As known to persons of ordinary skill in the art, the print shares 112 provide the necessary functionality for client devices (e.g., client device 150) to print on printers (e.g., printer 160) through print server 110. Similarly, print server 120 includes print shares 122, which enable client devices, such as client device 150 to print on printers, such as printer 160, through print server 120.

The migration server 130 includes network printer migration software 132a, which includes printer settings update tool 134 and map file 136. The map file 136 is linked to the printer settings update tool 134. The printer settings update tool 134 and the linked map file 136, while shown as residing within the migration server 130, may be remotely located from the migration server 130 and accessible via the network 180. Essentially, the printer settings update tool 134 is an executable file having as an input the linked map file 136. The linked map file 136 is specifically formatted to identify printers that have been migrated from print server 110 to print server 120, as described below.

The administrative device 140 includes administrative printer migration software 132b, and the client device 150 includes client printer migration software 132c. As discussed below with respect to FIGS. 3, 4 and 5, the network printer migration software 132a, the administrative printer migration software 132b and the client printer migration software 132c cooperate to facilitate the remote updating of printer settings in a networked environment. Therefore, elements 132a, 132b and 1 32c are sometimes referred to hereinafter collectively as printer migration software 132.

Migration server 130, administrative device 140 and client device 150 each also include web user application software and e-mail application software (not shown). The web application software allows each device 130, 140 and 150 to receive, process and display web content (i.e., hypertext markup language (HTML) documents and related information) that is received from other devices over the network 180 via the hypertext transfer protocol (HTTP). Essentially, the web content is code that includes, for example, hypertext mark-up language (HTML) commands that generate images, forms, etc., and includes graphics and code such as JAVA-Script and Java applets.

Likewise, the e-mail application software allows each device 130, 140 and 150 to receive, process and display e-mail content (i.e., text messages and computer files sent via the simple mail transfer protocol (SMTP)) that is received from other devices over the network 180.

The following is a brief description of the operation of the exemplar system shown in FIG. 1 when used to implement a method for facilitating the remote updating of the printer settings for client device 150 through network 180. Assume that client device 150 is configured to use print shares 112 on print server 110 to print via printer 160. When the user of client device 150 desires to print a document on printer 160, client device 150 communicates with print server 110 over network 180 and utilizes the print shares 112 on print server 110 to print the document on printer 160.

Assume, however, that print server 110 is replaced by print server 120 due to, for example, a system upgrade. When an old print server is replaced with a new print server, the printers that were formerly accessible through the old print server must now be accessed through the new print server. This is referred to as "migration" of the printers from the old print server to the new print server. This migration is typically accomplished by a system administrator. In the exemplar configuration of FIG. 1, a system administrator could use administrative device 140 to migrate the printers accessible through network 180, such as printer 160, from print server 110 to print server 120.

As part of the migration, the print shares 1 12 on print server 1 10 that point to printer 160, and the corresponding print shares 122 on print server 120 that point to printer 160, are stored in the map file 136. The map file 136 is specifically formatted to identify printers, such as printer 160, that have been migrated from one print server, such as print server 110, to another print server, such as print server 120.

Once the migration is accomplished, and the print server 110 is removed, a client device connected to the network 180, such as client device 150, can no longer utilize print shares 112 on print server 110 to print a document. In the exemplar configuration of FIG. 1, because client device 150 is configured to use print shares 112 through print server 110 in order to print via printer 160, client device 150 is no longer able to print via printer 160 because the print shares for which client device 150 is configured (i.e., print shares 112) are no longer available. Thus, in order to print via printer 160, client device 150 should be reconfigured to use print shares 122 through print server 120.

As described below with respect to FIGS. 3, 4 and 5, the information in map file 136 is used by the printer migration software 132 to automatically reconfigure the printer settings of client device 150 so that client device 150 can print a document on printer 160 by utilizing print shares 122 through print server 120. This allows a system administrator to reconfigure the printer settings of client device 150 through administrative device 140.

Figure 2:
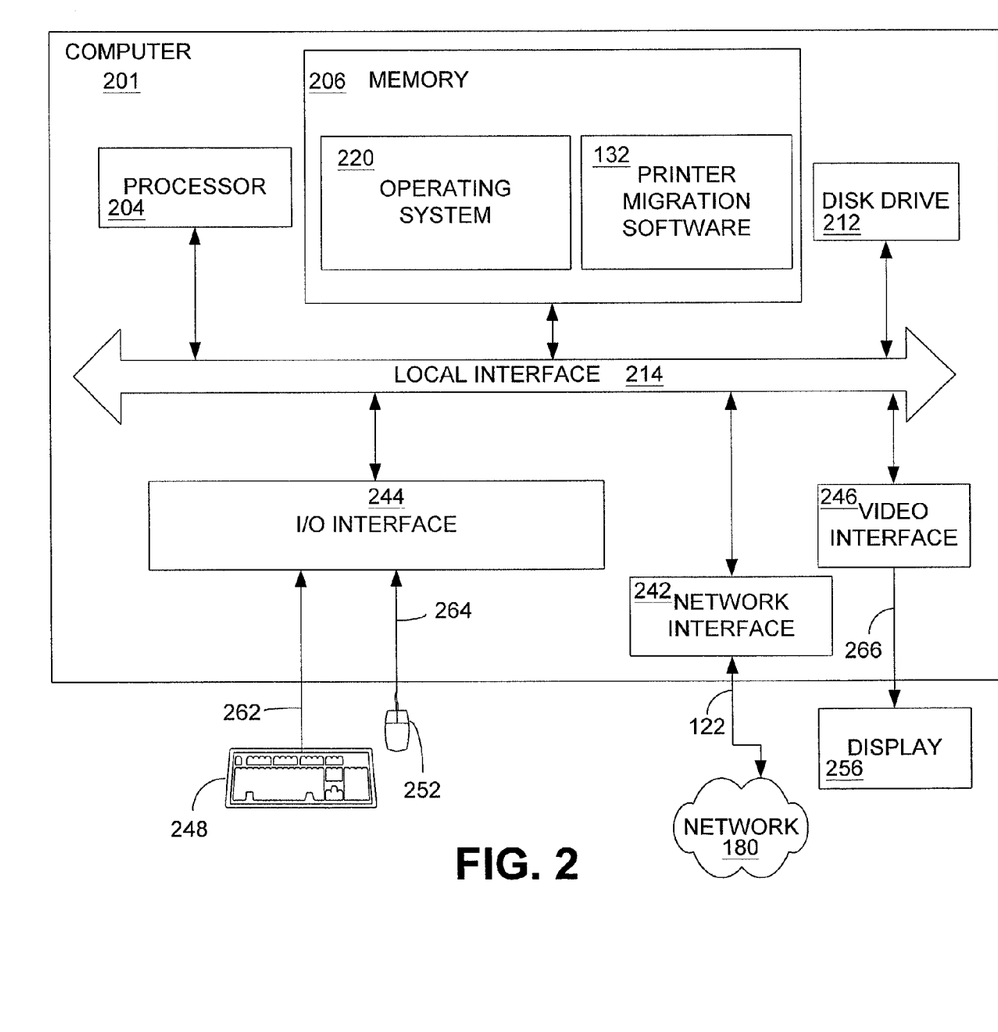
FIG. 2 is a block diagram illustrating an exemplar computer architecture which can be used to implement the migration server, the administrative device and the client device of FIG. 1.

An example of a general-purpose computer that can implement the software of the invention is shown in FIG. 2. FIG. 2 is a block diagram illustrating an exemplar computer 201. The migration server 130, the administrative device 140 and the client device 150 can each be implemented by a computer such as computer 201. The printer migration software 132 and other software and hardware elements (to be discussed with respect to FIG. 2) work in unison to implement the functionality of the invention.

Generally, in terms of hardware architecture, as shown in FIG. 2, an exemplar computer 201 includes a processor 204, memory 206, a disk drive 212, an I/O interface 244, a video interface 246, and a network interface 242 that are connected together and can communicate with each other via a local interface 214. The local interface 214 can be, for example but not limited to, one or more buses or other wired or wireless connections, as is known to those having ordinary skill in the art. The local interface 214 may have additional elements, which are omitted for simplicity, such as buffers (caches), drivers, and controllers, to enable communications. Further, the local interface 214 includes address, control, and data connections to enable appropriate communications among the aforementioned components.

The processor 204 is a hardware device for executing software that can be stored in memory 206. The processor 204 can be any custom made or commercially available processor, a central processing unit (CPU) or an auxiliary processor among several processors associated with the computer 201, and a microchip-based microprocessor or a macroprocessor. Examples of suitable commercially available microprocessors are as follows: a PA-RISC series microprocessor from Hewlett-Packard Company, an 80×86 or Pentium series microprocessor from Intel Corporation, a PowerPC microprocessor from IBM Corporation, a Sparc microprocessor from Sun Microsystems, Inc., or a 68xxx series microprocessor from Motorola Corporation.

The memory 206 can include any one or combination of volatile memory elements (e.g., random access memory (RAM, such as DRAM, SRAM, etc.)) and nonvolatile memory elements (e.g., RAM, ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The I/O interface 244 can receive commands from, for example, keyboard 248 via connection 262 and from mouse 252 via connection 264 and transfer those commands over the local interface 214 to the processor 204 and the memory 206.

The video interface 246 supplies a video output signal via connection 266 to the display 256. The display 256 can be a conventional CRT based display device, or can be any other display device, such as a liquid crystal display (LCD) or other type of display.

The network interface 242 can be any communication device capable of connecting the computer 201 to an external network 180, such as a network interface card located in the computer 201 or a modulator/demodulator (modem).

The software in memory 206 may include one or more separate programs, each of which comprises an ordered listing of executable instructions for implementing logical functions. In the example illustrated in FIG. 2, the software in the memory 206 includes the printer migration software 132. Although memory 206 of computer 201 is illustrated for simplicity as including all of the components which comprise the printer migration software 132, it should be understood that three separate computers may be used to implement the migration server 130, the administrative device 140 and the client device 150 of FIG. 1, respectively. Each of these computers would communicate with each other over the network 180. Likewise, the memory 206 in each of these computers would include the printer migration software to implement the functionality of the invention (i.e., the memory 206 of migration server 130 would include network printer migration software 132a, the memory 206 of administrative device 140 would include administrative printer migration software 132b, and the memory 206 of client device 150 would include client printer migration software 132c).

In the exemplar embodiment of FIG. 2, the memory 206 of computer 201 also includes a suitable operating system (O/S) 220. With respect to the operating system 220, a non-exhaustive list of examples of suitable commercially available operating systems 220 is as follows: a Windows operating system from Microsoft Corporation, a Netware operating system available from Novell, Inc., or a UNIX operating system, which is available for purchase from many vendors, such as Hewlett-Packard Company, Sun Microsystems, Inc., and AT&T Corporation. The operating system 220 essentially controls the execution of other computer programs, such as printer migration software 132, and provides scheduling, input-output control, file and data management, memory management, and communication control and related services. The processor 204 and operating system 220 define a computer platform, for which application programs, such as printer migration software 132, are written in higher level programming language(s).

If the computer 201 is a PC, the software in the memory 206 further includes a basic input output system (BIOS) (omitted for simplicity). The BIOS is a set of essential software routines that test hardware at startup, start the O/S 220, and support the transfer of data among the hardware devices. The BIOS is stored in ROM so that it can be executed when the computer 201 is activated.

When the computer 201 is in operation, the processor 204 is configured to execute software stored within the memory 206, to communicate data to and from the memory 206 and to generally control operations of the computer 201 pursuant to the software. In the example illustrated in FIG. 2, printer migration software 132, and the O/S 220, in whole or in part, but typically the latter, are read by the processor 204, perhaps buffered within the processor 204, and then executed.

When embodiments of the invention are implemented primarily in software, as is shown in FIG. 2, it should be noted that the printer migration software 132 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The printer migration software 132 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The hardware components of the invention can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
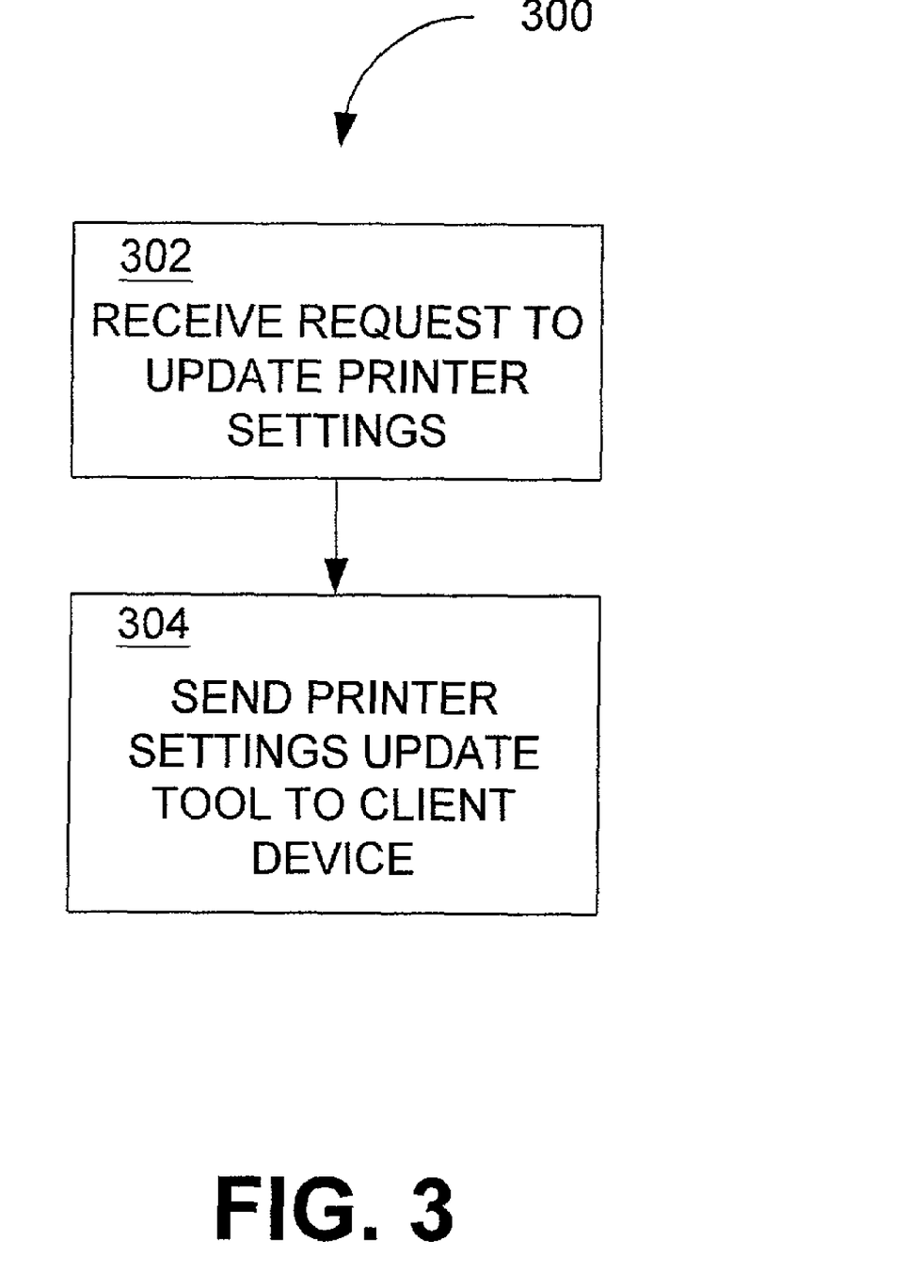
FIG. 3 is a flowchart illustrating the operation of an exemplar embodiment of the network printer migration software portion of the printer migration software of FIGS. 1 and 2.
Figure 4:
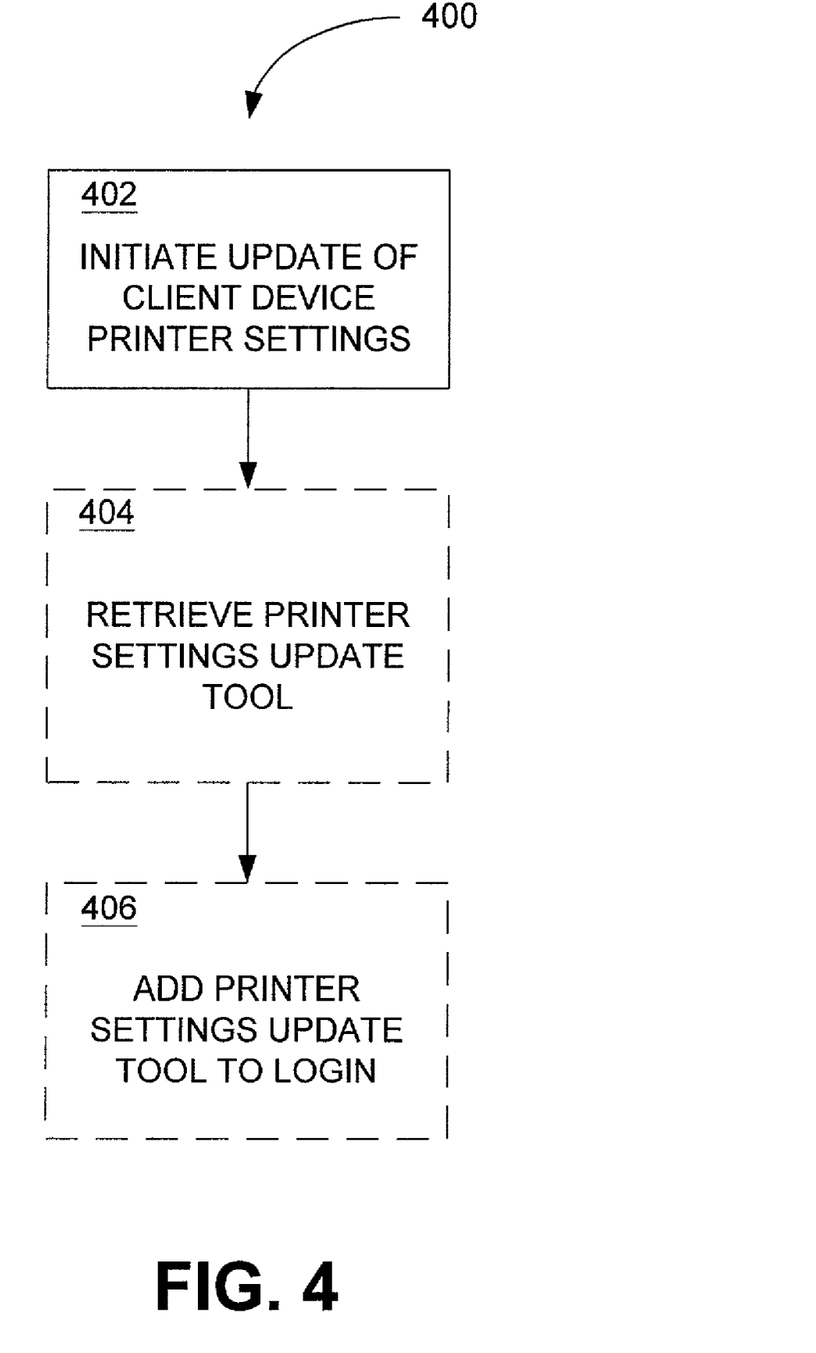
FIG. 4 is a flowchart illustrating the operation of an exemplar embodiment of the administrative printer migration software portion of the printer migration software of FIGS. 1 and 2.
Figure 5:
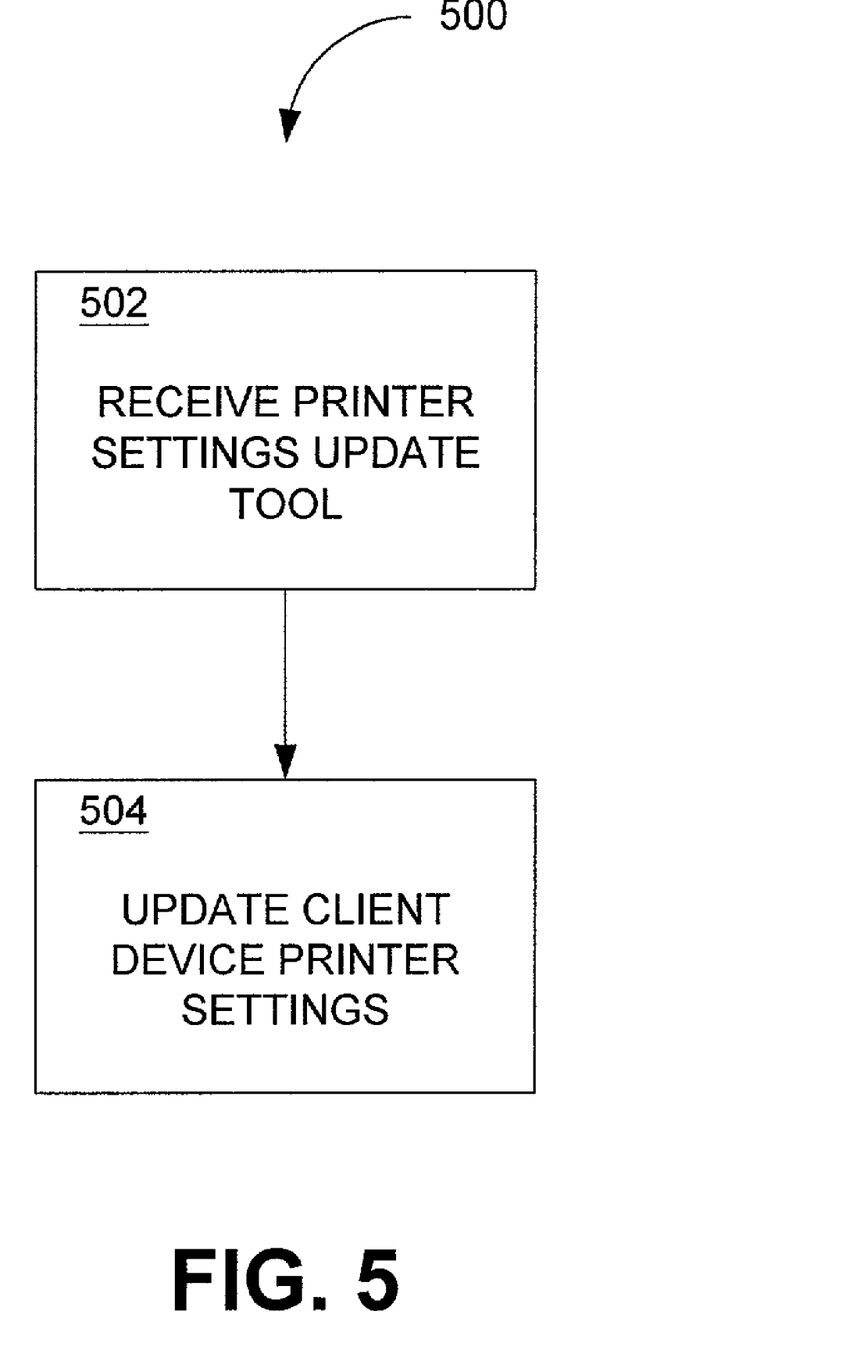
FIG. 5 is a flowchart illustrating the operation of an exemplar embodiment of the client printer migration software portion of the printer migration software of FIGS. 1 and 2.

FIGS. 3, 4 and 5 are flowcharts which collectively illustrate the operation of particular embodiments of printer migration software 132 in the exemplar system of FIG. 1. As discussed below, the printer migration software 132 is a utility that allows a system administrator using administrative device 140 to remotely update the printer settings on client device 150 from print shares 112 on print server 110 to print shares 122 on print server 120.

Any process descriptions or blocks in the flow charts to follow should be understood as representing modules, segments, or portions of code which include one or more executable instructions for implementing specific logical functions or steps in the process, and alternative implementations are included within the scope of embodiments of the invention. For example, functions may be executed out of order from that shown or discussed, including substantially concurrently or in reverse order, depending on the functionality involved, as would be understood by those reasonably skilled in the art of the present invention.

FIG. 3 is a flowchart 300 of an exemplar embodiment of the network printer migration software 132a portion of the printer migration software 132 of FIGS. 1 and 2. In block 302, remote updating of the printer settings for a client device, such as client device 150, is initiated when the migration server 130 receives a request to send the printer settings update tool 134, including the linked map file 136, to a specified client device. The request is typically initiated by an administrator through administrative device 140. Alternatively, the request could be initiated by a user of client device 150. The request includes information needed by the network printer migration software portion 132a of the printer migration software 132, such as the identity of the specific client device for which the update is requested (e.g., client device 150), and the way in which the printer settings update tool 134, including the map file 136, should be sent to the client device.

In block 304, the migration server 130 responds to the request by sending the printer settings update tool 134, including the linked map file 136, over the network 180 according to the information contained in the request. In this example, the printer settings update tool 134, including the linked map file 136, is sent to client device 150 in the way specified in the request. Various alternative ways known to persons of ordinary skill in the art may be specified in the request and used by the migration server 130 to send the printer settings update tool 134, including the linked map file 136, to the client device 150. A non-limiting example would be by creating a web page with a link to the printer settings update tool 134, including the linked map file 136, creating an e-mail with a link to the web page, and sending the e-mail from the migration server 130 to the client device 150.

As noted, the printer settings update tool 134 is linked to the map file 136. In a preferred embodiment, the printer settings update tool 134 is an executable program which accepts map file 136 as an input parameter. The map file 136 is specifically formatted to identify printers that were formerly accessible through print shares 112 on print server 110 and that are now accessible through print shares 122 on print server 120. The printer settings update tool 134 and the map file 136 are linked using methods known to persons of ordinary skill in the art, such as the use of a batch file or a Visual Basic Script. It should be noted that if another system printer migration occurs (i.e., if print server 120 is replaced by another print server) map file 136 can be reconfigured and the updated migration information can be provided through printer settings update tool 134 via the linked and reconfigured map file 136.

FIG. 4 is a flowchart 400 of an exemplar embodiment of the administrative printer migration software 132b portion of the printer migration software 132 of FIGS. 1 and 2. In block 402, an administrator, using administrative device 140, facilitates an update of the settings for a client device, such as client device 150. This may be accomplished by sending a request to the migration server 130 to update the printer settings on client device 150 to correspond to print shares 122 on print server 120. The request can be made by various means known to persons or ordinary skill in the art, such as but not limited to, by sending an e-mail request to the migration server 130.

The request in block 402 includes information needed by the network printer migration software portion 132a of the printer migration software 132, such as the identity of the specific client device for which the update is requested (e.g., client device 150), and the way in which the printer settings update tool 134, including the linked map file 136, should be sent to the client device. The request in block 402 causes the initiation of the network printer migration software 132a portion of the printer migration software 132, as discussed above with respect to FIG. 3.

An alternative embodiment of the administrative printer migration software 132b portion of the printer migration software 132 is shown in dotted lines in FIG. 4. In this alternative embodiment, after completing block 402, the administrative printer migration software 132b portion of the printer migration software 132 proceeds to block 404 and retrieves the printer settings update tool 134, including the linked map file 136, from the migration server 130. Then, in step 406, the administrative printer migration software 132b portion of the printer migration software 132 adds the retrieved printer settings update tool 134, including the linked map file 136, to the login procedure for client device 150. This can be accomplished in various alternative ways known to persons of ordinary skill in the art, including but not limited to, adding the printer settings update tool 134, including the linked map file 136, to the login script environment for the client device 150. If the system utilizes a Microsoft Windows operating system that includes the Windows Script Host administration tool, the printer settings update tool 134, including the linked map file 136, can be added to the Windows Script Host environment. At the completion of block 406 the printer settings update tool 134, including the linked map file 136, is accessible to the client device 150 upon login.

FIG. 5 is a flowchart 500 of an exemplar embodiment of the client printer migration software 132c portion of the printer migration software 132 of FIGS. 1 and 2. In block 502, the client device 150 receives the printer settings update tool 134, including the linked map file 136. As noted above, this can be accomplished in various ways known to persons of ordinary skill in the art. For example, if the printer settings update tool 134, including the linked map file 136, is sent to the client device 150 via an e-mail message containing a link to a web page, in block 502 the user of client device 150 would open the e-mail message, follow the link to the web page, and click on the link to access the printer settings update tool 134, including the linked map file 136. Alternatively, if the printer settings update tool 134, including the linked map file 136, is provided to the client device 150 as part of the login script environment or Windows Script Host environment, the user of client device 150 would access the printer settings update tool 134, including the linked map file 136, upon login.

Once the printer settings update tool 134, including the linked map file 136, is received by the client device, in block 504 the client printer migration software 132c portion of printer migration software 132 uses the printer settings update tool 134, including the linked map file 136, to automatically update the printer settings for client device 150 to correspond to print shares 122 on print server 120.

In a preferred embodiment, the printer settings update tool 134, including the linked map file 136, is implemented as an executable program. In this embodiment, block 504 would simply execute the program. Upon execution, the printer settings update tool 134 compares the printers accessible through client device 150 to the printers in the linked map file 136. Then, when a match is found, the printer settings update tool 134 automatically updates the printer settings in client device 150 to correspond to the migrated print shares for the matched printer.

It will be apparent to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

The invention claimed is:

1. A method for updating a printer setting on a client device in a network, in which the client device is configured to interface with a first printer via a first print server That operates as an interface between the client device and at least the first printer, the method comprising:
   a migration server receiving a request to send a printer settings update tool to the client device, the printer settings update tool including a map file that at least indirectly identifies the first printer as having been migrated from the first print server to the second print server, the printer settings update tool being operable to automatically update printer settings for the client device according to the map file;
   the migration server providing the printer settings update tool to the client device resulting in the client device utilizing the printer settings update tool to automatically updates the printer settings according to the map file so that the client device is reconfigured to interface with the first printer via the second print server.

2. The method of claim 1, wherein the migration server providing comprises the migration server providing the printer settings update tool to the client device via e-mail.

3. The method of claim 2, wherein the e-mail includes a link to a web page and wherein the client device obtains the information by accessing the web page.

4. The method of claim 1, wherein the migration server providing comprises the migration server providing the printer settings update tool to the client device in the form of a file.

5. The method of claim 4, wherein the file is an executable program that when executed by the client device automatically reconfigures the client device to interface with the first printer via the second print server.

6. The method of claim 5, wherein the executable program includes the map file.

7. The method of claim 1, wherein the migration server providing comprises the migration server providing the printer settings update tool such that the client device receives the printer settings update tool upon logging in to the network.

8. The method of claim 7, wherein the client device logs in to the network according to a login script that includes the printer settings update tool.

9. The method of claim 7, wherein the client device logs in to the network through a Windows Script Host environment that includes the printer settings update tool.

10. The method of claim 1, wherein the migration server receiving the request comprises the migration server receiving the request from a device remote from the client device.

11. The method of claim 10, wherein the migration server receiving the request comprises the migration server receiving the request from an administrative device.

12. A system for updating a printer setting on a client device in a network, the client device being configured to interface with a printer via a first print server, the system comprising:
   a migration server coupled to the network; and
   a second print server coupled to the network and operative as an interface for the printer;
   wherein the migration server is configured to receive a request to send a printer settings update tool to the client device, the printer settings update tool including a map file that at least indirectly identifies the first printer as having been migrated from the first print server to the second print server, the printer settings update tool being operable to automatically update printer settings for the client device according to the map file and to provide the printer settings update tool to the client device resulting in the client device utilizing the printer settings update tool to automatically update the printer settings according to the map file so that the client device is reconfigured to interface with the first printer via the second print server.

13. The system of claim 12, wherein the migration server is configured to provide the printer settings update tool to the client device via e-mail.

14. The system of claim 13, wherein the e-mail includes a link to a web page from which the client device can obtain the printer settings update tool.

15. The system of claim 12, wherein the migration server is configured to provide the printer settings update tool to the client device as a file.

16. The system of claim 15, wherein the file comprises an executable program that when executed by the client device automatically reconfigures the client device to interface with the printer via the second print server.

17. The system of claim 16, wherein the executable program further comprises the map.

18. The system of claim 12, wherein the migration server is configured to provide the printer settings update tool such that the client device receives the printer settings update tool upon logging in to the network.

19. The system of claim 18, wherein the migration server is configured to provide the printer settings update tool such that the client device receives the printer settings update tool upon logging in to the network and logons to the network according to a login script that includes the printer settings update tool.

20. The system of claim 18, wherein the migration server is configured to provide the printer settings update tool such that the client device receives the printer settings update tool upon logging in to the network and logons to the network through a Windows Script Host environment that includes the printer settings update tool.

21. A computer readable medium having a computer program stored thereon, the computer program being executable for updating a printer setting on a client device configured to interface with a printer via a first print server in a network, the computer program being operative to perform a method comprising:
   receiving a request to send a printer settings update tool to the client device, the printer settings update tool including a map file that at least indirectly identifies the first printer as having been migrated from the first print server to the second print server, the printer settings update tool being operable to automatically update printer settings for the client device according to the map file;
   providing the printer settings update tool to the client device resulting in the client device utilizing the printer settings update tool to automatically update the printer settings according to the map file so that the client device is reconfigured to interface with the first printer via a second print server.

22. The computer readable medium of claim 21, wherein providing the printer settings update tool to the client device comprises providing the printer settings update tool to the client device via e-mail.

23. The computer readable medium of claim 22, wherein the e-mail includes a link to a web page through which the client device can access the printer settings update tool.

24. The computer readable medium of claim 21, wherein providing the printer settings update tool to the client device comprises providing the printer settings update tool to the client device as a file.

25. The computer readable medium of claim 24, wherein the file comprises an executable program that when executed by the client device automatically reconfigures the client device to interface with the printer via the second print server.

26. The computer readable medium of claim 25, wherein the executable program further comprises the map file.

27. The computer readable medium of claim system of claim 21, wherein providing the printer settings update tool to the client device comprises providing the printer settings update tool such that the client device receives The printer settings update tool upon logging in to the network.

* * * * *

UNITED STATES PATENT AND TRADEMARK OFFICE
CERTIFICATE OF CORRECTION

PATENT NO. : 7,146,413 B2
APPLICATION NO. : 10/172656
DATED : December 5, 2006
INVENTOR(S) : Jennifer Mae Spitzer et al.

It is certified that error appears in the above-identified patent and that said Letters Patent is hereby corrected as shown below:

In column 9, line 45, in Claim 1, delete "That" and insert -- that --, therefor.

In column 9, line 59, in Claim 1, delete "updates" and insert -- update --, therefor.

In column 10, line 63, in Claim 17, delete "map." and insert -- map file. --, therefor.

In column 12, line 23, in Claim 27, after "medium of" delete "claim system of".

In column 12, line 26, in Claim 27, delete "The" and insert -- the --, therefor.

Signed and Sealed this

Twenty-fifth Day of August, 2009

David J. Kappos
*Director of the United States Patent and Trademark Office*